United States Patent
Murata et al.

(10) Patent No.: US 9,902,428 B2
(45) Date of Patent: Feb. 27, 2018

(54) JOINING STRUCTURE OF VEHICLE FRAME

(71) Applicant: TOYOTA JIDOSHA KABUSHIKI KAISHA, Toyota-shi (JP)

(72) Inventors: Soshiro Murata, Toyota (JP); Takashi Sasaki, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/149,370

(22) Filed: May 9, 2016

(65) Prior Publication Data

US 2017/0008565 A1 Jan. 12, 2017

(30) Foreign Application Priority Data

Jul. 6, 2015 (JP) ................. 2015-135306

(51) Int. Cl.
| | |
|---|---|
| *B62D 21/11* | (2006.01) |
| *B62D 21/15* | (2006.01) |
| *B62D 27/02* | (2006.01) |
| *B62D 29/00* | (2006.01) |

(52) U.S. Cl.
CPC ............ *B62D 21/11* (2013.01); *B62D 21/155* (2013.01); *B62D 27/023* (2013.01); *B62D 29/008* (2013.01)

(58) Field of Classification Search
CPC .... B62D 21/11; B62D 21/155; B62D 27/023; B62D 29/008
See application file for complete search history.

(56) References Cited

U.S. PATENT DOCUMENTS

| | | | | |
|---|---|---|---|---|
| 5,085,485 A * | 2/1992 | Wurl | .................... | B62D 29/008 293/155 |
| 6,010,155 A * | 1/2000 | Rinehart | ................ | B62D 21/02 280/781 |
| 6,270,152 B1 * | 8/2001 | Sato | ........................ | B62D 21/11 296/192 |
| 6,679,523 B2 * | 1/2004 | Yamamoto | ............... | B60G 7/02 180/311 |
| 6,789,811 B2 * | 9/2004 | Huber | .................... | B60G 7/001 280/124.133 |

(Continued)

FOREIGN PATENT DOCUMENTS

| | | |
|---|---|---|
| JP | 8-268324 | 10/1996 |
| JP | 2005-289131 | 10/2005 |

*Primary Examiner* — Laura Freedman
(74) *Attorney, Agent, or Firm* — Oblon, McClelland, Maier & Neustadt, L.L.P.

(57) ABSTRACT

A joining structure of a vehicle frame that includes: a vehicle frame including a tubular first frame and a second frame, the first frame being formed in a closed cross section shape by extrusion molding of a lightweight metal, the second frame being formed in an open cross section shape of which one side is open by die-casting of a lightweight metal, and the second frame being superposed with the first frame in a state of contact therewith; a slit portion formed in the second frame, the slit portion extending along a marginal edge portion at an opening direction side of the second frame; a first welded portion structured by welding the marginal edge portion of the second frame to the first frame; and a second welded portion structured by welding a periphery edge portion of the slit portion to the first frame.

7 Claims, 7 Drawing Sheets

(56) References Cited

U.S. PATENT DOCUMENTS

| | | | | |
|---|---|---|---|---|
| 7,458,625 B2* | 12/2008 | Kimura | ............... | B62D 29/008 |
| | | | | 180/90 |
| 7,584,815 B2* | 9/2009 | Ogawa | ................... | B60G 3/20 |
| | | | | 180/312 |
| 8,668,251 B2* | 3/2014 | Fujita | ................. | B62D 21/152 |
| | | | | 296/146.5 |
| 9,067,621 B2* | 6/2015 | Ohhama | ............... | B62D 21/11 |
| 9,085,122 B2* | 7/2015 | Ohhama | ............... | B32B 15/043 |
| 9,108,680 B2* | 8/2015 | Suzuki | ............... | B62D 25/082 |
| 9,216,775 B2* | 12/2015 | Ohhama | ............... | B62D 21/11 |
| 9,260,133 B2* | 2/2016 | Hata | .................. | B23K 20/122 |
| 2006/0284449 A1* | 12/2006 | Miyahara | ............. | B62D 21/11 |
| | | | | 296/204 |
| 2007/0169982 A1 | 7/2007 | Ogawa et al. | | |
| 2014/0246882 A1* | 9/2014 | Miyahara | ............. | B62D 21/00 |
| | | | | 296/203.01 |
| 2015/0298739 A1* | 10/2015 | Buschjohann | ......... | B62D 21/02 |
| | | | | 296/193.08 |
| 2016/0068193 A1* | 3/2016 | Koike | ............... | B62D 25/2045 |
| | | | | 296/187.09 |
| 2016/0375938 A1* | 12/2016 | Matsuo | ................. | B62D 21/11 |
| | | | | 296/204 |
| 2017/0113723 A1* | 4/2017 | Murata | ............... | B62D 21/152 |
| 2017/0137071 A1* | 5/2017 | Kurokawa | ........... | B62D 27/023 |

* cited by examiner

JOINING STRUCTURE OF VEHICLE FRAME

CROSS-REFERENCE TO RELATED APPLICATION

This application is based on and claims priority under 35 USC 119 from Japanese Patent Application No. 2015-135306 filed on Jul. 6, 2015, which is incorporated by reference herein.

BACKGROUND

Technical Field

The present disclosure relates to a joining structure of a vehicle frame.

Related Art

There is a mounting structure (for example, see Japanese Patent Application Laid-Open (JP-A) No. H08-268324) in which a mounting bracket includes a horizontal portion and vertical flanges that are formed to inflect vertically from each of two ends of the horizontal portion. The mounting bracket covers an extruded member with a rectangular closed cross section shape, and distal end portions of the vertical flanges are arc-welded to wall face portions of the extruded member.

However, if the extruded member is deformed by bending toward the side thereof at which the mounting bracket is disposed by a load inputted by a collision of the vehicle or the like, the arc-welded portions may break and it may not be possible for the extruded member to absorb the load. In other words, in a structure in which a load is absorbed by bending deformation of a frame formed by extrusion molding, withstand load strength and robustness of the frame may not be assured.

SUMMARY

Accordingly, an object of the present disclosure is to provide a joining structure of a vehicle frame that may assure withstand load strength and robustness of a frame that is formed by extrusion molding and absorbs an inputted load by bending deformation.

In order to achieve the object described above, a joining structure of a vehicle frame according to a first aspect includes: a vehicle frame including a tubular first frame and a second frame, the first frame being formed in a closed cross section shape by extrusion molding of a lightweight metal, the second frame being formed in an open cross section shape of which one side is open by die-casting of a lightweight metal, and the second frame being superposed with the first frame in a state of contact therewith; a slit portion formed in the second frame, the slit portion extending along a marginal edge portion at the opening direction side of the second frame; a first welded portion structured by welding of the marginal edge portion of the second frame to the first frame; and a second welded portion structured by welding of a periphery edge portion of the slit portion to the first frame.

According to the first aspect, when a load is inputted to the first frame from an extension direction one end portion side thereof by a vehicle collision or the like, because of the difference in strength between the first frame and the second frame, the extension direction one end portion of the first frame deforms by bending toward the second frame. In this structure, the second frame includes the first welded portion, at which the marginal edge portion of the second frame is welded to the first frame, and the second welded portion, at which the periphery edge portion of the slit portion is welded to the first frame.

Therefore, when the extension direction one end portion of the first frame deforms by bending toward the second frame, bending stress thereof is dispersed into the first welded portion and the second welded portion (i.e., the bending stress is not concentrated at a single welded portion). Consequently, breakages of the first welded portion and the second welded portion are suppressed, and separation of the first frame from the second frame is suppressed. As a result, withstand load strength and robustness of the first frame are assured and the inputted load can be efficiently absorbed by bending deformation of the first frame.

In a joining structure of a vehicle frame according to a second aspect, in the joining structure of a vehicle frame of the first aspect, a first neutral plane includes a first neutral axis of the first frame when the first frame deforms by bending toward the side thereof at which the second frame is disposed, the opening direction of the second frame being the normal direction of the first neutral plane, a second neutral plane includes a second neutral axis of the vehicle frame when the first frame deforms by bending toward the side thereof at which the second frame is disposed, the opening direction of the second frame being the normal direction of the second neutral plane, and at least one of the first welded portion or the second welded portion is disposed between the first neutral plane and the second neutral plane.

According to the second aspect, at least one of the first welded portion and the second welded portion is disposed between the first neutral plane and the second neutral plane. In this structure, the region between the first neutral plane and the second neutral plane is a region in which bending stress tends not to act. Therefore, bending stresses acting on the first welded portion and the second welded portion are reduced, and breakages of the first welded portion and the second welded portion are further suppressed.

In a joining structure of a vehicle frame according to a third aspect, in the joining structure of a vehicle frame of the second aspect, the first welded portion coincides with the first neutral plane.

According to the third aspect, because the first welded portion coincides with the first neutral plane, bending stress acting on the first welded portion is reduced further and breakage of the first welded portion is more effectively suppressed.

In a joining structure of a vehicle frame according to a fourth aspect, in the joining structure of a vehicle frame of the second aspect or the third aspect, the second welded portion coincides with the second neutral plane.

According to the fourth aspect, because the second welded portion coincides with the second neutral plane, bending stress acting on the second welded portion is reduced further and breakage of the second welded portion is more effectively suppressed.

In a joining structure of a vehicle frame according to a fifth aspect, in the joining structure of a vehicle frame of any of the first to fourth aspects, the slit portion opens at an extension direction one end portion side of the second frame, and the first welded portion and the second welded portion extend to positions beyond the extension direction one end portion of the second frame.

According to the fifth aspect, the extension direction one end portion side of the second frame is opened up at the slit portion, and the first welded portion and second welded portion extend to positions beyond the extension direction one end portion of the second frame. Consequently, breakages of the first welded portion and the second welded portion at the extension direction one end portion of the second frame are even further suppressed.

DESCRIPTION OF EMBODIMENTS

Herebelow, an exemplary embodiment relating to the present disclosure is described in detail with reference to the drawings. For convenience of description, the arrow UP that is shown where appropriate in the drawings indicates a vehicle body upward direction, the arrow FR indicates a vehicle body forward direction, and the arrow RH indicates a vehicle body rightward direction. In the following descriptions, where the directions up, down, front, rear, left and right are recited without being particularly specified, the same represent up and down in the vehicle body up-and-down direction, the front and rear in the vehicle body front-and-rear direction, and left and right in the vehicle body left-and-right direction (the vehicle width direction).

Herein, a suspension member 12 is described as an application example of a joining structure 10 for a vehicle frame according to the present embodiment. However, the joining structure 10 for a vehicle frame according to the present embodiment is not limited to being applied to the suspension member 12.

Figure 1:
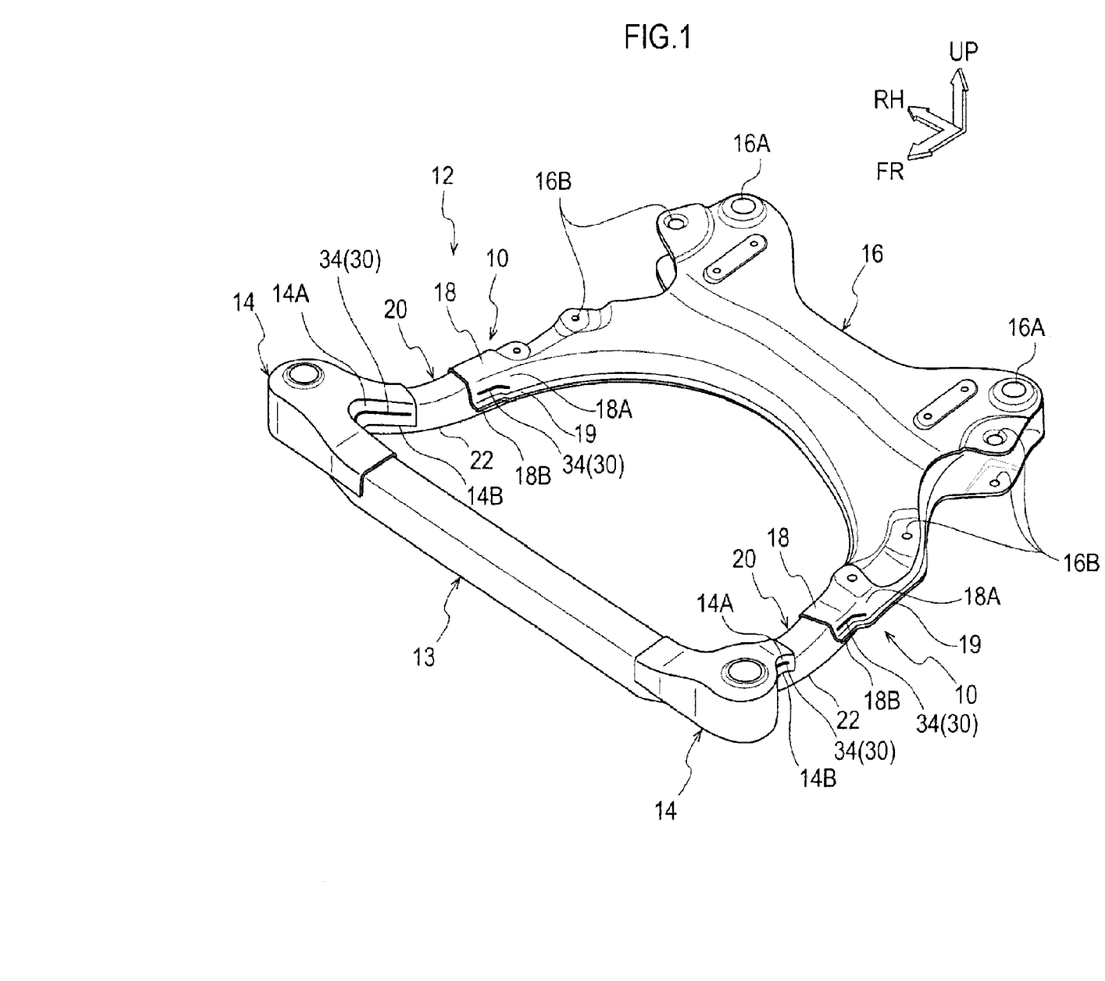
FIG. 1 is a perspective view, seen from diagonally above, showing a suspension member that is equipped with a joining structure of a vehicle frame in accordance with a present embodiment.
Figure 2:
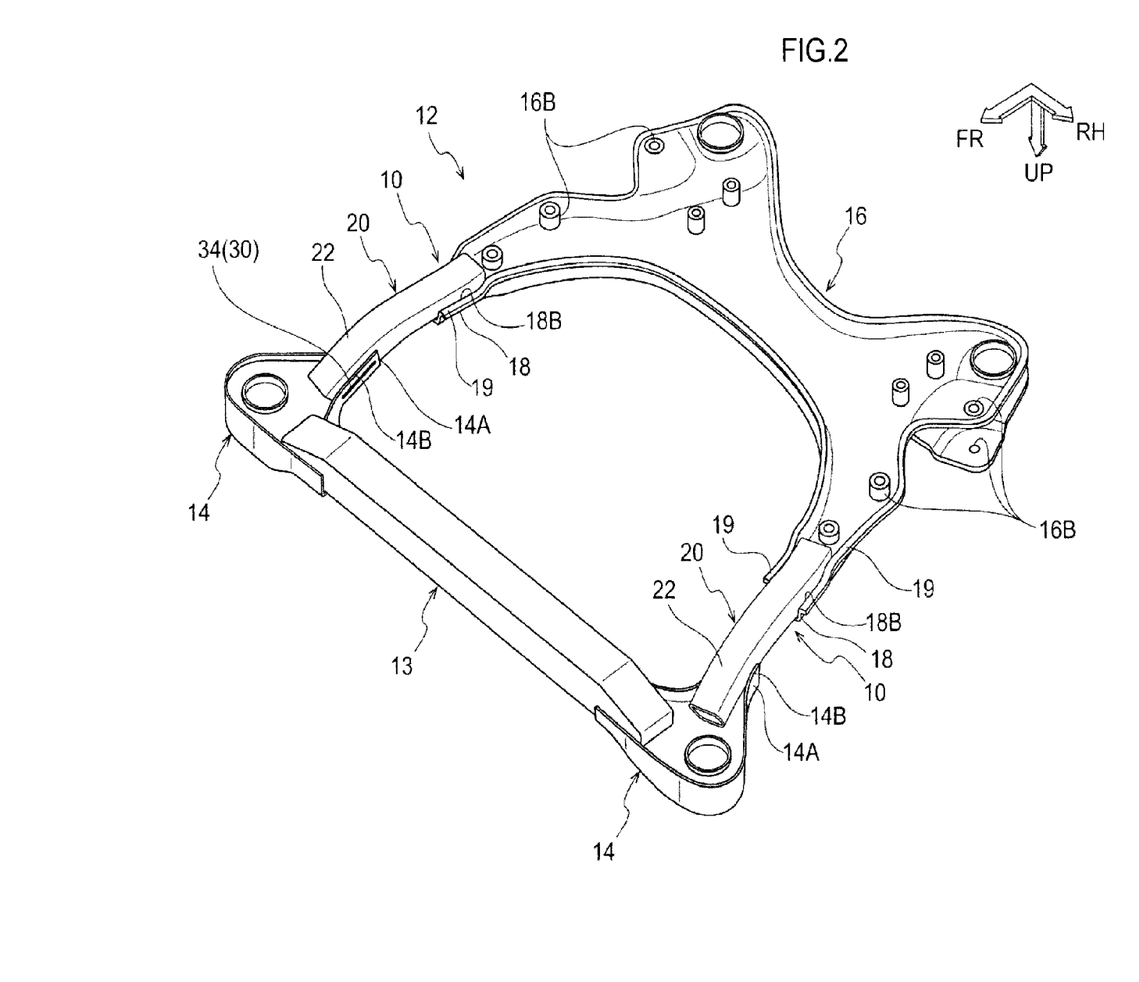
FIG. 2 is a perspective view, seen from diagonally below, showing the suspension member that is equipped with the joining structure of a vehicle frame in accordance with the present embodiment.
Figure 3:
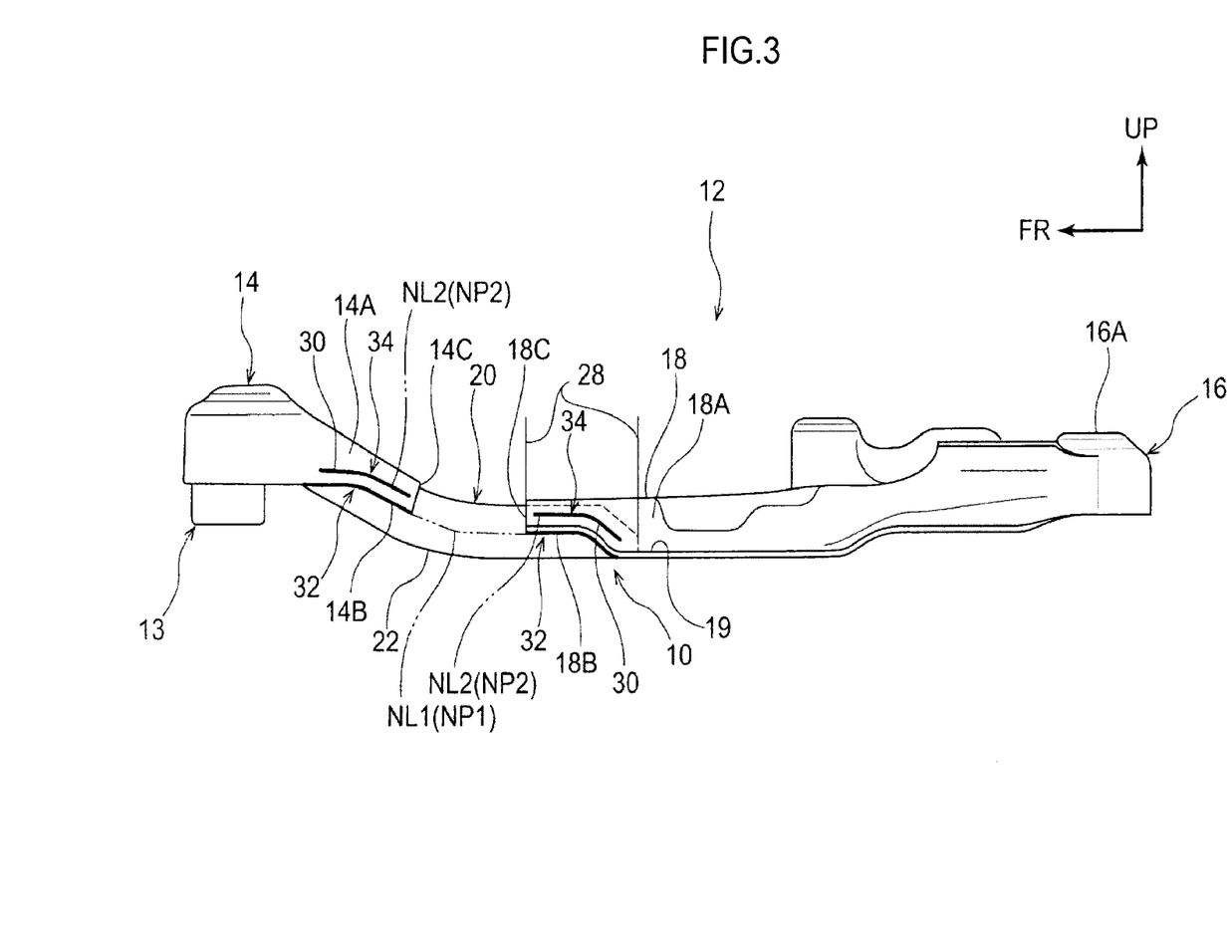
FIG. 3 is a side view showing the suspension member that is equipped with the joining structure of a vehicle frame in accordance with the present embodiment.

The suspension member 12 shown in FIG. 1 to FIG. 3 is supported at front portion lower sides of a pair of left and right front side members that extend in the vehicle body front-and-rear direction. The suspension member 12 is supported in a state of being suspended from the front side members. Each front side member includes a kick portion for disposing the vehicle body front portion side thereof higher than the vehicle body rear portion side thereof.

Accordingly, a pair of left and right front body mounts 14 are mounted to front end portions of the front side members at the vehicle body front side relative to the kick portions, and a pair of left and right fastening portions 16A of a rear cross-member 16 are mounted to lower end portions of the kick portions. The front body mounts 14, which are described below, are front end portions of the suspension member 12 and the rear cross-member 16, which is described below, is a rear end portion of the suspension member 12.

The suspension member 12 is provided with a front cross-member 13, the pair of left and right front body mounts 14, the rear cross-member 16, and a pair of left and right side rails 20. The front cross-member 13 extends in the vehicle width direction. The front body mounts 14 are joined to both of vehicle width direction end portions of the front cross-member 13. The rear cross-member 16 extends in the vehicle width direction and includes a pair of left and right sub-side rails 18. The sub-side rails 18 extend integrally to respective vehicle body front outer sides from two vehicle width direction end portions of the rear cross-member 16. The side rails 20 extend in the extension directions of the sub-side rails 18, vehicle body front side end portions of the side rails 20 are joined to the front body mounts 14, and vehicle body rear side end portions of the side rails 20 are joined to the sub-side rails 18.

The front cross-member 13 and the side rails 20 are formed in constant rectangular closed cross section shapes (square tube shapes) by extrusion molding of a lightweight metal material such as an aluminium alloy or the like. The front cross-member 13 and side rails 20 have high ductility. Each side rail serves as first frame. The side rail 20 includes, at a substantially central portion in the length direction (extension direction) thereof, a curved portion 22 that forms a protrusion toward the vehicle body lower side in a side view seen in the vehicle width direction (a downward protrusion shape).

Each front body mount 14 is formed in an open cross section shape, of which the vehicle body lower side is open, by die-casting of a lightweight metal material such as an aluminium alloy or the like. The front body mount 14 is structured to be supported at the front end portion of the front side member. The rear cross-member 16 is also formed in an open cross section shape, of which the vehicle body lower side is open, by die-casting of a lightweight metal material such as an aluminium alloy or the like. Each sub-side rail 18 serves as a second frame and is formed in an open cross section shape of which the vehicle body lower side is open (substantially an inverted "U" shape in cross section).

Substantially an upper half (upper side) of an end portion of each side rail 20 at the vehicle body rear side relative to the curved portion 22 is covered by the sub-side rail 18 and is linearly joined to the sub-side rail 18 by arc welding. Substantially the lower half (lower side) of the end portion of the side rail 20 at the vehicle body rear side relative to the curved portion 22 is not covered by the sub-side rail 18 or the like but is left in a state of being exposed to the exterior. Hereinafter, a particular region including a region in which inner faces of the sub-side rail 18 are superposed with outer faces of the side rail 20 from thereabove in a state of surface contact is referred to as a side frame 28, which serves as the vehicle frame (see FIG. 3 and FIG. 4).

Substantially an upper half (upper side) of an end portion of the side rail 20 at the vehicle body front side relative to the curved portion 22 is covered by a portion of the front body mount 14 that extends to the vehicle body rear side and is linearly joined thereto by arc welding. Substantially the lower half (lower side) of the end portion of the side rail 20 at the vehicle body front side relative to the curved portion 22 is not covered by the front body mount 14 or the like but is left in a state of being exposed to the exterior.

Now, the joining structures 10 at the side frames 28, which is to say the joining structures 10 between the side rails 20 and the side frames 28, are described in more detail. The joining structures 10 between the side rails 20 and the front body mounts 14 are similar, and therefore descriptions thereof are omitted as appropriate. Ribs 19, which are described below, are not shown in FIG. 5.

Figure 4:
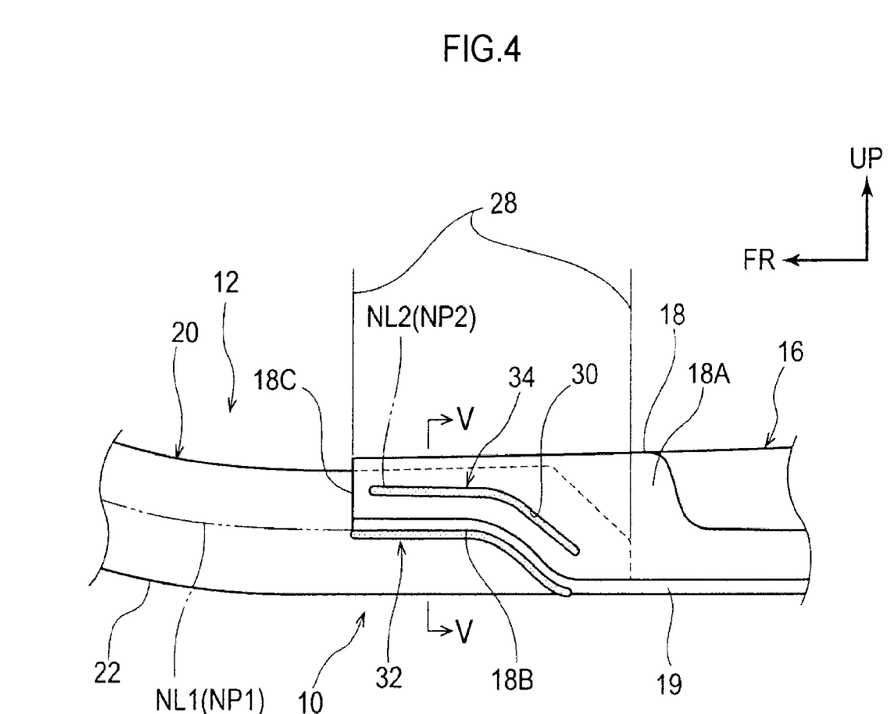
FIG. 4 is a side view showing a magnification of principal portions of the suspension member that is equipped with the joining structure of a vehicle frame in accordance with the present embodiment.
Figure 5:
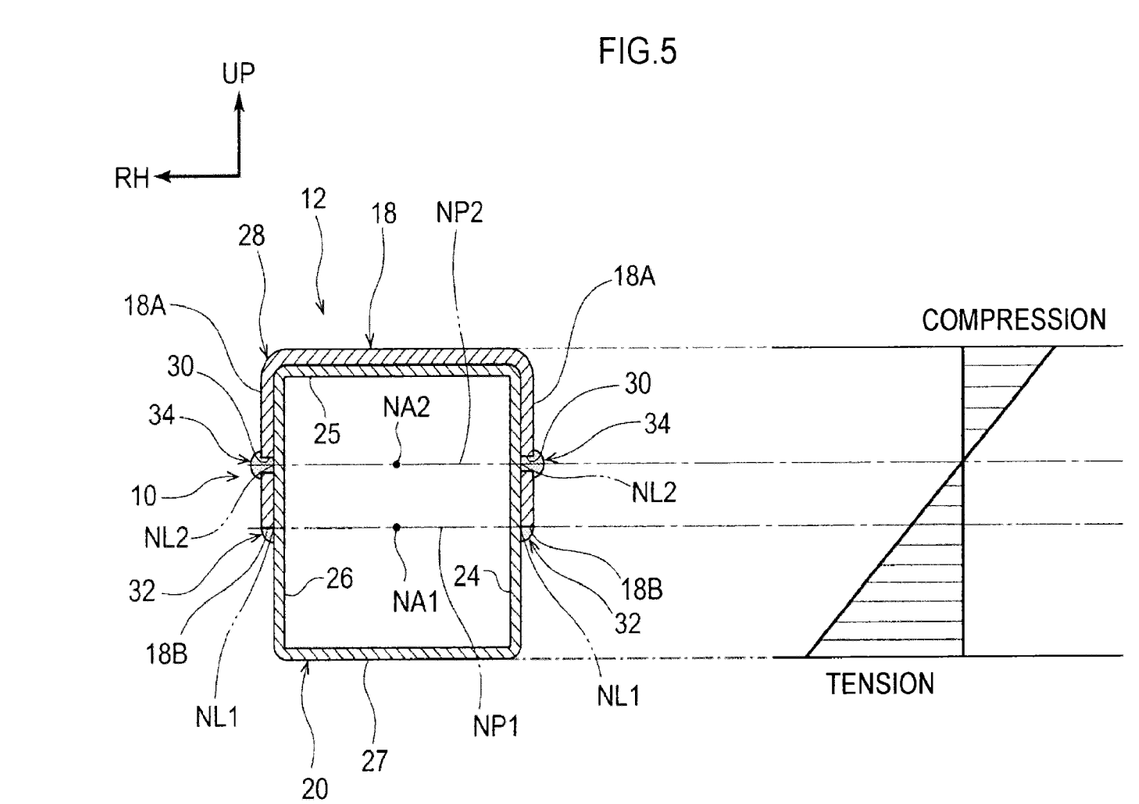
FIG. 5 is a sectional view taken along line V-V in FIG. 4 and an explanatory diagram showing a distribution of bending stress that acts when a side rail deforms by bending from a curved portion toward a side thereof at which a sub-side rail is disposed.

As shown in FIG. 4 and FIG. 5, a side wall of each side rail 20 that faces to the vehicle width direction outer side is an outer wall (wall portion) 24, and a side wall of the side rail 20 that faces to the vehicle width direction inner side is an inner wall (wall portion) 26. There are linear regions (along the length direction of the side rail 20) at vehicle body up-and-down direction midway portions of the outer wall 24 and the inner wall 26. If the front end portion of the side rail 20 is deformed by bending from the curved portion 22 toward the vehicle body upper side thereof, respective bending stresses (tensile deformation forces and compressive deformation forces) tend not to act on the linear regions.

When the side rail 20 deforms by bending from the curved portion 22 into a downward protrusion shape, a tensile force toward the side of the side rail 20 at which a lower wall 27 is disposed (a lower face side) and a compressive force toward the side of the side rail 20 at which an upper wall 25 is disposed (an upper face side) tend not to act on the linear regions. A first neutral plane NP1 is an imaginary plane including a first neutral axis NA1 that runs along the length direction through a center of the cross section of the side rail 20 in the drawings. (The first neutral plane NP1 is substantially central between the tensile force and the compressive force, and does not lengthen or shorten in the length direction between before and after the deformation.) The linear regions are imaginary nodal line regions (hereinafter referred to as "the first nodal line portions NL1") between the first neutral plane NP1 and the outer wall 24 and inner wall 26 of the side rail 20.

Marginal edge portions at the opening direction sides of left and right side walls 18A of the sub-side rail 18 (marginal edge portions substantially along the length direction of the sub-side rail 18) are lower end portions 18B. The lower end portions 18B are linearly joined by arc welding along the first nodal line portions NL1. (Herebelow, these linear joined portions are referred to as "first welded portions 32".) That is, in a side view seen in the vehicle width direction, the first welded portions 32 coincide with the first neutral plane NP1.

As shown in FIG. 1 and FIG. 3 to FIG. 5, slit portions 30 with long, narrow shapes are formed in the portions of the left and right side walls 18A of the sub-side rail 18 (of each side frame 28) that are superposed with the outer wall 24 and inner wall 26 of the side rail 20 in states of surface contact therewith. The slit portions 30 run along the lower end portions 18B of the side walls 18A.

When the side rail 20 deforms by bending from the curved portion 22 into the downward protrusion shape, the tensile force at the side at which the lower wall 27 is disposed (the lower face side) and the compressive force at the side at which the upper wall 25 is disposed (the upper face side) both tend not to act at the slit portions 30. A second neutral plane NP2 is an imaginary plane including a second neutral axis NA2 that runs along the length direction through a center of the cross section of the side frame 28 in the drawings. (The second neutral plane NP2 is substantially central between the tensile force and the compressive force, and does not lengthen or shorten in the length direction between before and after the deformation.) The slit portions 30 expose imaginary nodal line regions (hereinafter referred to as "the second nodal line portions NL2") between the second neutral plane NP2 and the outer wall 24 and inner wall 26 of the side rail 20.

Periphery edge portions of the slit portions 30 in the left and right side walls 18A of the sub-side rail 18 are linearly joined by arc welding along the second nodal line portions NL2. (Herebelow, these linear joined portions are referred to as "second welded portions 34".) That is, in the side view seen in the vehicle width direction, the second welded portions 34 coincide with the second neutral plane NP2.

The meanings of the terms "first nodal line portion NL1" and "second nodal line portion NL2" as used in relation to the present embodiment are not limited to precise imaginary nodal lines but encompass substantial imaginary nodal lines that are slightly offset from the precise imaginary nodal lines. In the present embodiment, each first welded portion 32 coincides with the first neutral plane NP1 and each second welded portion 34 coincides with the second neutral plane NP2, but this is not limiting. It is sufficient if at least one of the first welded portion 32 and the second welded portion 34 is disposed between the first neutral plane NP1 and the second neutral plane NP2 in the side view seen in the vehicle width direction.

As shown in FIG. 3 and FIG. 4, in the side view seen in the vehicle width direction, a rear end upper portion of the side rail 20 (of the side frame 28) that is covered by the sub-side rail 18 is cut away diagonally toward the vehicle body lower rear side. Therefore, the first neutral plane NP1 of the side rail 20 and the second neutral plane NP2 of the side frame 28 are angled to the vehicle body lower rear side toward the rear end portions thereof.

Accordingly, the lower end portions 18B and slit portions 30 (arc-welded portions) of the sub-side rail 18 that are arc-welded to the outer wall 24 and inner wall 26 of the side rail 20 are inclined toward the vehicle body lower rear side toward the rear end portion of the side rail 20. The same applies to a front end portion of the side rail 20, which is covered by the front body mount 14, and to lower end portions 14B and slit portions 30 (arc-welded portions) of the front body mount 14 (see FIG. 3).

Overlap amounts of the side rail 20 with the sub-side rail 18 and the front body mount 14, which is to say lengths of the first welded portions 32 and second welded portions 34 (arc-welded portions) along the length direction of the side rail 20, are quantitatively specified in advance. In particular, the length of each second welded portion 34 (slit portion 30) is formed to be as long as possible with a view to improving joining strength.

However, the lengths of the first welded portions 32 and second welded portions 34 are shorter than in a suspension member in which only the first welded portions 32 are provided, as described below. Moreover, in this structure a front end portion 18C of the sub-side rail 18 and a rear end portion 14C of the front body mount 14 are not joined (arc-welded) to the outer wall 24, upper wall 25 and inner wall 26 of the side rail 20. Thus, compressive deformation (plastic deformation), which is described below, is not inhibited.

As shown in FIG. 1 to FIG. 4, the sub-side rail 18 is formed of thick plate, which is thicker than the side rail 20, in a shape that is a substantial hat shape in cross section. That is, the ribs 19 are integrally formed at the lower end portions 18B of the left and right side walls 18A of the sub-side rail 18. The ribs 19 protrude to the vehicle width direction outer side and the vehicle width direction inner side. Thus, strength and stiffness of the sub-side rail 18 are further improved.

A power unit including an engine and a transmission is provided at the vehicle body front side of the suspension member 12. Accordingly, engine mounts for supporting the power unit from the lower side thereof may be provided at a vehicle width direction substantially central portion of the front cross-member 13 of the suspension member 12.

As shown in FIG. 1 to FIG. 3, substantially an upper half of each of two vehicle width direction end portions of the front cross-member 13 is covered by a portion of the front body mount 14 that extends toward the vehicle width direction inner side and is linearly joined thereto by arc welding. Substantially the lower half of each vehicle width direction end portion of the front cross-member 13 is not covered by the front body mount 14 or the like but is left in a state of being exposed to the exterior.

As shown in FIG. 2, each of the two vehicle width direction end portions of the front cross-member 13 is cut away diagonally toward the vehicle width direction upper outer side (downward to the vehicle width direction inner side). That is, there are no sudden changes in the cross-sectional shape of each vehicle width direction end portion of the front cross-member 13. Therefore, reductions in strength of the two vehicle width direction end portions of the front cross-member 13 are suppressed or prevented.

As shown in FIG. 1 and FIG. 2, the fastening portion 16A is formed at each of the two vehicle width direction end portions of the rear cross-member 16, for mounting the rear cross-member 16 to the lower end portions of the kick portions of the front side members. In addition, lower arm mounting portions 16B are formed at the two vehicle width direction end portions of the rear cross-member 16, for mounting lower arms that structure a vehicle suspension to the rear cross-member 16.

Now, operations are described for the suspension member 12 equipped with the joining structure 10 for a vehicle frame (the side frame 28) according to the present embodiment that is structured as described above.

As described above, the engine mounts that support the power unit from the lower side are provided at the vehicle width direction substantially central portion of the front cross-member 13. Therefore, if the vehicle has a frontal collision, a portion of the impact load is inputted through the power unit to the front cross-member 13 of the suspension member 12.

The rear cross-member 16 including the sub-side rails 18 is formed by die-casting. Thus, strength and stiffness thereof are assured. In particular, the plate thickness of each sub-side rail 18 is formed to be thicker than the plate thickness of the side rail 20, and the ribs 19 that protrude to the vehicle width direction outer side and the vehicle width direction inner side are formed integrally at the lower end portions 18B of the side walls 18A of the sub-side rails 18 (formed in hat shapes in cross section). Therefore, strength and stiffness of the sub-side rails 18 are improved.

Figure 6:
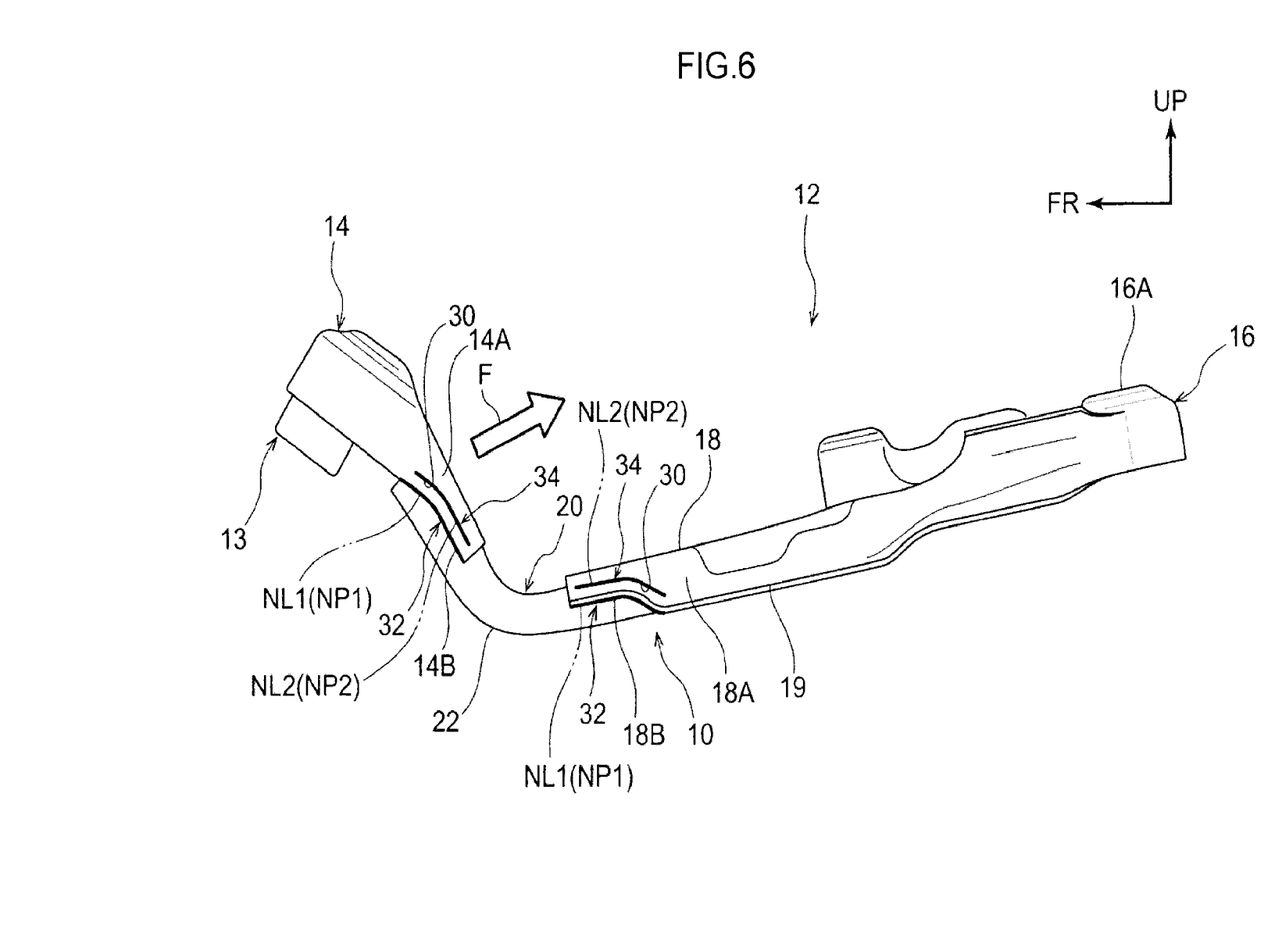
FIG. 6 is a side view showing the suspension member that is equipped with the joining structure of a vehicle frame in accordance with the present embodiment after a frontal collision.

As a result, when a portion of an impact load is inputted to the front cross-member 13 from the vehicle body front side, because of a difference in yield strength (a strength difference) between each sub-side rail 18 and side rail 20, as shown in FIG. 6, the curved portion 22 deforms by bending such that the front end portion of the side rail 20 moves to the vehicle body upper rear side (in the direction of arrow F), and deformation of the front end portion 18C of the sub-side rail 18 to the vehicle body upper rear side is suppressed or prevented.

At this time, because substantially the lower half of the portion of the side rail 20 that is at the vehicle body rear side relative to the curved portion 22 is not covered by the sub-side rail 18 but is left in the state of being exposed to the exterior, there is no risk of bending deformation of the side rail 20 from the curved portion 22 (energy absorption by plastic deformation) being impeded by the sub-side rail 18.

To describe this in more detail, if, for example, the structure was such that the sub-side rail had a closed cross section shape and the vehicle body rear side end portion of the side rail 20 were inserted into and joined (welded) inside the sub-side rail, the substantial lower half of the vehicle body rear side end portion of the side rail 20 would be covered by the sub-side rail. Consequently, plastic deformation of the tensile deformation side (the lower face side) of the side rail 20 might be impeded by the sub-side rail.

In contrast, the suspension member 12 equipped with the joining structure 10 according to the present embodiment has a structure in which the substantial lower half of the vehicle body rear side end portion of the side rail 20 is not covered by a covering member such as the sub-side rail or the like. Therefore, there is no risk of plastic deformation of the tensile deformation side (lower face side) of the side rail 20 being impeded.

Further, because this is a structure in which the front end portion 18C of the sub-side rail 18 is not joined (arc-welded) to the outer wall 24, upper wall 25 and inner wall 26 of the side rail 20, there is also no risk of plastic deformation of the compressive deformation side (the upper face side) of the side rail 20 being impeded. Therefore, the side rail 20 may easily deform by bending from the curved portion 22.

The lower end portions 18B of the side walls 18A of the sub-side rail 18 and the periphery edge portions of the slit portions 30 are joined by arc-welding to the outer wall 24 and inner wall 26 of the side rail 20, to form the first welded portions 32 and the second welded portions 34 (i.e., plural welded portions). Therefore, bending stress when the side rail 20 deforms by bending from the curved portion 22 is not concentrated at a single welded portion.

In other words, bending stress when the side rail 20 deforms by bending from the curved portion 22 is dispersed into the first welded portions 32 and second welded portions 34 that are joining portions with the sub-side rail 18. Therefore, breakages of the first welded portions 32 and the second welded portions 34 are suppressed or prevented, and separation of the side rail 20 from the sub-side rail 18 is suppressed or prevented. Thus, withstand load strength and robustness of the side rail 20 may be assured.

Given the above, the energy of a portion of an impact load that is inputted to the front cross-member 13 of the suspension member 12 via a power unit is efficiently absorbed by bending deformation (plastic deformation) of the side rails 20 of the suspension member 12 from the curved portions 22.

In particular, because each curved portion 22 is formed at a substantially central portion in the length direction of the side rail 20, the load tends to concentrate at the curved portion 22. Therefore, bending deformation of the side rail 20 from the curved portion 22 may be promoted (excellently controlled) and energy absorption characteristics may be improved.

Substantially the lower half of the end portion of the side rail 20 at the vehicle body front side relative to the curved portion 22 is not covered by the front body mount 14 but is left in the state of being exposed to the exterior, and the rear end portion 14C of the front body mount 14 is not joined (arc-welded) to the outer wall 24, upper wall 25 and inner wall 26 of the side rail 20.

Therefore, there is no risk of bending deformation of the side rail 20 from the curved portion 22 (energy absorption by plastic deformation) being impeded by the front body mount 14. That is, there is no risk of plastic deformation of either the tensile deformation side (the lower face side) or the compressive deformation side (the upper face side) of the side rail 20 being impeded by the front body mount 14. Thus, the side rail 20 may deform by bending from the curved portion 22 more easily.

Bending stress when the side rail 20 deforms by bending from the curved portion 22 is dispersed into the first welded portions 32 and second welded portions 34 that are joining portions with the front body mount 14. Therefore, breakages of the first welded portions 32 and the second welded portions 34 are suppressed or prevented, and separation of the side rail 20 from the front body mount 14 is suppressed or prevented.

Thus, withstand load strength and robustness of the side rail 20 may be further assured, and the energy of a portion of an impact load that is inputted to the front cross-member 13 is even more efficiently absorbed by the side rails 20.

The lower end portions 18B of the side walls 18A of each sub-side rail 18 and the periphery edge portions of the slit portions 30 are linearly joined by arc-welding at the respective first nodal line portions NL1 and the second nodal line portions NL2 of the outer wall 24 and inner wall 26 of the side rail 20. Therefore, even when the side rail 20 deforms by bending from the curved portion 22, bending stresses tend not to act on the first welded portions 32 and the second welded portions 34 (i.e., bending stresses at the first welded portions 32 and the second welded portions 34 are kept to a minimum).

Accordingly, even when the side rail 20 deforms by bending from the curved portion 22 into the downward protrusion shape, breakages of the first welded portions 32 and second welded portions 34 may be more effectively suppressed or prevented, and separation of the side rail 20 from the sub-side rail 18 may be more effectively suppressed or prevented. Therefore, there is no risk of energy absorption characteristics of the side rails 20 being degraded.

Similarly, the lower end portions 14B of the side walls 14A of each front body mount 14 and the periphery edge portions of the slit portions 30 are linearly joined by arc welding at the respective first nodal line portions NL1 and second nodal line portions NL2 of the outer wall 24 and inner wall 26 of the side rail 20. Therefore, even when the side rail 20 deforms by bending from the curved portion 22, bending stresses tend not to act on the first welded portions 32 and the second welded portions 34 (i.e., bending stresses at the first welded portions 32 and the second welded portions 34 are kept to a minimum).

Accordingly, even when the side rail 20 deforms by bending from the curved portion 22 into the downward protrusion shape, breakages of the first welded portions 32 and second welded portions 34 may be more effectively suppressed or prevented, and separation of the side rail 20 from the front body mount 14 may be more effectively suppressed or prevented. Therefore, there is no risk of energy absorption characteristics of the side rails 20 being degraded.

In the suspension member 12, the side walls 18A of each sub-side rail 18 and the side walls 14A of each front body mount 14 respectively include the first welded portions 32 and the second welded portions 34. Therefore, the lengths of the first welded portions 32 and second welded portions 34 may be shorter than in, for example, a suspension member that includes only the first welded portions 32, even while the withstand load strength and robustness of the side rail 20 are assured.

Thus, the length of the sub-side rail 18 may be made shorter and a region of the side rail 20 that is not covered by the sub-side rail 18 or the front body mount 14 may be increased (made longer in the length direction). Hence, bending deformation of the side rail 20 from the curved portion 22 into the downward protrusion shape may be even further promoted (a stroke length of the bending deformation may be lengthened), and energy absorption characteristics may be further improved.

Because the front body mounts 14 and the rear cross-member 16 are formed by die-casting of a lightweight metal material such as an aluminium alloy or the like, seat faces, bosses and the like for mounting other assembled components may be formed easily. That is, the front body mounts 14 and the rear cross-member 16, even though high in stiffness, may be improved in the degree of freedom of shape and a number of components may be reduced (shapes may be rationalized).

Because the front body mounts 14 and the rear cross-member 16 are formed in open cross section shapes of which the vehicle body lower sides are open, assembly (joining) thereof to the front cross-member 13, the side rails 20 and the like is simple. Therefore, an assembly procedure of the suspension member 12 may be simplified. Moreover, because the lengths of the sub-side rails 18 are shortened as described above and the sub-side rails 18 are joined to the rear end portions of the side rails 20, the suspension member 12 may be reduced in weight in accordance with the lengths of the sub-side rails 18.

Because the front cross-member 13 and the side rails 20 are formed by extrusion molding of a lightweight metal material such as an aluminium alloy or the like, similarly to the front body mounts 14 and the rear cross-member 16, a degree of freedom of shape may be improved and, because there is no need to cover substantial lower halves of the respective end portions with covering members or the like, the number of components may be reduced. Therefore, the suspension member 12 that is formed of lightweight metal material may be further reduced in weight.

Because each side rail 20 and sub-side rail 18 are linearly joined by arc welding, the two may be strongly joined together. Thus, ingressions of foreign matter between the side rail 20 and the sub-side rail 18 may be suppressed or prevented. Therefore, occurrences of corrosion between the side rail 20 and the sub-side rail 18 may be suppressed or prevented. The same applies to the linear joins by arc welding between each side rail 20 and front body mount 14.

Figure 7:
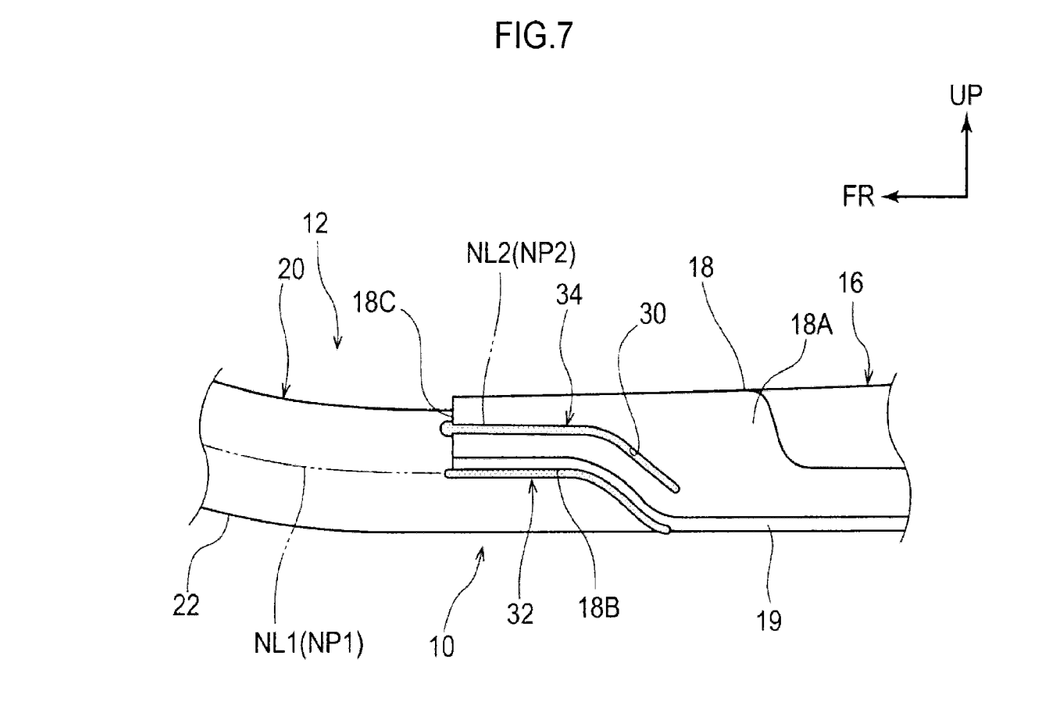
FIG. 7 is a side view showing a magnification of principal portions of a suspension member that is equipped with a variant example of the joining structure of a vehicle frame in accordance with the present embodiment.

As shown in FIG. 7, the front side end portion of each side wall 18A of each sub-side rail 18 (side frame 28) relative to the slit portion 30 (i.e., an extension direction one end portion side of the sub-side rail 18) may be cut away and opened up, and the arc-welding may be performed to include this region. To describe this in more detail, in the side frame 28 shown in FIG. 1 to FIG. 6, the front side end portion of the side wall 18A of the sub-side rail 18 relative to the slit portion 30 cannot be arc-welded. Therefore, if bending stress acts on that region, the second welded portion 34 is more vulnerable to breakage.

However, if the front side end portion of the side wall 18A of the sub-side rail 18 relative to the slit portion 30 is opened up and the second welded portion 34 is lengthened toward the vehicle body front side (i.e., the arc welding goes beyond the front end portion 18C of the side wall 18A), joining strength and stiffness of the front side end portion may be improved. Consequently, even if bending stress acts on the front side end portion, the second welded portion 34 is unlikely to break. It is desirable if each first welded portion 32 is also lengthened toward the vehicle body front side (the arc welding thereof goes beyond the front end portion 18C of the side wall 18A). Hence, breakages of the first welded portions 32 and the second welded portions 34 may be suppressed even further.

Hereabove, the joining structure 10 of the vehicle frame (side frame 28) according to the present embodiment is described in accordance with the attached drawings. However, the joining structure 10 according to the present embodiment is not limited to the illustrated structures but may be appropriately modified in design within a technical scope not departing from the gist of the present disclosure. For example, the curved portion 22 of the side rail 20 is not limited to a structure that is formed at a substantially central portion in the length direction of the side rail 20.

Further, provided the structure is capable of suppressing or preventing separation of the side rail 20 from the sub-side rail 18 (breakage of the first welded portions 32 and the second welded portions 34) when the side rail 20 deforms by bending from the curved portion 22, the regions of the lower end portions 18B of the side walls 18A of the sub-side rail 18 and of the periphery edge portions of the slit portions 30 that are arc-welded (linearly joined) need not be at the first nodal line portions NL1 and the second nodal line portions NL2 of the outer wall 24 and inner wall 26 of the side rail 20.

Provided the strength and stiffness of the sub-side rail 18 are thoroughly assured, the ribs 19 need not be formed at the lower end portions 18B of the side walls 18A. The welding that linearly joins the side rail 20 to the sub-side rail 18 and the front body mount 14 is not limited to arc welding but may be, for example, laser welding or the like. A lightweight metal material is not limited to an aluminium alloy but may be, for example, a magnesium alloy, a titanium alloy or the like.

The joining structure 10 according to the present embodiment is not limited to a structure that is applied to the side rails 20 and the sub-side rails 18 and front body mounts 14 of the suspension member 12. For example, the joining structure 10 may be applied to the front cross-member 13 and front body mounts 14 of the suspension member 12, and may be applied to the front side members and suchlike. Moreover, the joining structure 10 according to the present embodiment is not limited to a structure that is applied to a frame with a rectangular shape in cross section but may be applied to, for example, a frame with a circular shape in cross section.

According to the first aspect, withstand load strength and robustness of the first frame, which is formed by extrusion molding and absorbs an inputted load by bending deformation, may be assured.

According to the second aspect, bending stresses acting on the first welded portion and the second welded portion may be reduced and breakages of the first welded portion and the second welded portion may be further suppressed.

According to the third aspect, bending stress acting on the first welded portion may be further suppressed and breakage of the first welded portion may be more effectively suppressed.

According to the fourth aspect, bending stress acting on the second welded portion may be further suppressed and breakage of the second welded portion may be more effectively suppressed.

According to the fifth aspect, breakages of the first welded portion and the second welded portion at the extension direction one end portion of the second frame may be even further suppressed.

The invention claimed is:

1. A joining structure of a vehicle frame, comprising:
the vehicle frame including a tubular first frame and a second frame, the first frame being formed in a closed cross section shape by extrusion molding of a lightweight metal, the second frame being formed in an open cross section shape of which one side is open by die-casting of a lightweight metal, and the second frame being superposed with the first frame in a state of contact therewith;
a slit portion formed in the second frame, the slit portion extending along a marginal edge portion at an opening direction side of the second frame;
a first welded portion structured by welding the marginal edge portion of the second frame to the first frame; and
a second welded portion structured by welding a periphery edge portion of the slit portion to the first frame, wherein:
a first neutral plane includes a first neutral axis of the first frame when the first frame deforms by bending toward a side thereof at which the second frame is disposed, the opening direction of the second frame being a normal direction of the first neutral plane,
a second neutral plane includes a second neutral axis of the vehicle frame when the first frame deforms by bending toward the side thereof at which the second frame is disposed, the opening direction of the second frame being a normal direction of the second neutral plane, and
at least one of the first welded portion or the second welded portion is disposed between the first neutral plane and the second neutral plane.

2. The joining structure of a vehicle frame according to claim 1, wherein the first welded portion coincides with the first neutral plane.

3. The joining structure of a vehicle frame according to claim 1, wherein the second welded portion coincides with the second neutral plane.

4. The joining structure of a vehicle frame according to claim 1, wherein:
the slit portion opens at an extension direction one end portion side of the second frame, and
the first welded portion and the second welded portion extend to positions beyond the extension direction one end portion side of the second frame.

5. The joining structure of a vehicle frame according to claim 1, wherein:
the first frame includes, at an extension direction central portion thereof, a curved portion that, in a side view seen in a vehicle width direction, forms a protrusion toward a vehicle body lower side, and
a lower half of an end portion of the first frame at a vehicle body rear side relative to the curved portion is exposed to an exterior.

6. The joining structure of a vehicle frame according to claim 5, wherein a lower half of an end portion of the first frame, at a vehicle body front side relative to the curved portion, is exposed to the exterior.

7. A joining structure of a vehicle frame, comprising:
the vehicle frame including a tubular first frame and a second frame, the first frame being formed in a closed cross section shape by extrusion molding of a lightweight metal, the second frame being formed in an open cross section shape of which one side is open by die-casting of a lightweight metal, and the second frame being superposed with the first frame in a state of contact therewith;
a first slit portion and a second slit portion formed in the second frame, the first slit portion extending along a first marginal edge portion at an opening direction side on a first side of the second frame, and the second slit portion extending along a second marginal edge portion at the opening direction side on a second side of the second frame;
a first welded portion structured by welding the first marginal edge portion of the first side of the second frame to a first side of the first frame;
a second welded portion structured by welding a periphery edge portion of the first slit portion to the first side of the first frame;
a third welded portion structured by welding the second marginal edge portion of the second side of the second frame to a second side of the first frame; and
a fourth welded portion structured by welding a periphery edge portion of the second slit portion to the second side of the first frame,
wherein the closed cross section shape of the first frame is rectangular, and
wherein a rear section of the first marginal edge portion is inclined and the first slit portion follows the inclined rear section of the first marginal edge portion, and a rear section of the second marginal edge portion is inclined and the second slit portion follows the inclined rear section of the second marginal edge portion.

* * * * *